United States Patent
Takahashi et al.

(10) Patent No.: US 10,766,229 B2
(45) Date of Patent: Sep. 8, 2020

(54) ADHESIVE, LAMINATE, PACKAGING MATERIAL FOR BATTERY CASING, BATTERY CASE, AND METHOD OF PRODUCING BATTERY CASE

(71) Applicant: SHOWA DENKO K.K., Tokyo (JP)

(72) Inventors: Kentarou Takahashi, Tatsuno (JP); Hiroto Kouka, Himeji (JP); Yasuhiro Nakagawa, Kakogawa (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/608,973

(22) PCT Filed: Oct. 4, 2018

(86) PCT No.: PCT/JP2018/037239
§ 371 (c)(1),
(2) Date: Oct. 28, 2019

(87) PCT Pub. No.: WO2019/097887
PCT Pub. Date: May 23, 2019

(65) Prior Publication Data
US 2020/0189236 A1 Jun. 18, 2020

(30) Foreign Application Priority Data
Nov. 16, 2017 (JP) .................. 2017-220686

(51) Int. Cl.
| B32B 15/095 | (2006.01) |
| H01M 2/02 | (2006.01) |
| B32B 7/12 | (2006.01) |
| B32B 15/20 | (2006.01) |
| C09J 175/04 | (2006.01) |
| B32B 27/40 | (2006.01) |

(52) U.S. Cl.
CPC .............. B32B 15/095 (2013.01); B32B 7/12 (2013.01); B32B 15/20 (2013.01); B32B 27/40 (2013.01); C09J 175/04 (2013.01); H01M 2/0287 (2013.01)

(58) Field of Classification Search
CPC ......... B32B 15/095; B32B 15/20; B32B 7/12; B32B 27/40; C09J 175/04; H01M 2/0287
USPC ....................................................... 429/163
See application file for complete search history.

(56) References Cited

U.S. PATENT DOCUMENTS

| 2004/0084138 A1 | 5/2004 | Henke et al. |
| 2006/0052523 A1 | 3/2006 | Bushendorf et al. |
| 2016/0145477 A1 | 5/2016 | Kandori et al. |
| 2017/0207427 A1 | 7/2017 | Kouka et al. |
| 2018/0162100 A1 | 6/2018 | Fukase et al. |

FOREIGN PATENT DOCUMENTS

| CN | 102159611 A | 8/2011 | |
| CN | 103525355 A | 1/2014 | |
| CN | 104159987 A | 11/2014 | |
| CN | 107236107 A | 10/2017 | |
| JP | 2004-018606 A | 1/2004 | |
| JP | 2005-063685 A | 3/2005 | |
| JP | 2010-092703 A | 4/2010 | |
| JP | 2011-187385 A | 9/2011 | |
| JP | 2013-241508 A | 12/2013 | |
| TW | 201609845 A | 3/2016 | |
| WO | 2012/077329 A1 | 6/2012 | |
| WO | WO-2012077329 A1 * | 6/2012 | ........... C08G 18/672 |
| WO | 2014/208518 A1 | 12/2014 | |
| WO | 2016/021279 A1 | 2/2016 | |
| WO | 2016/199551 A1 | 12/2016 | |

OTHER PUBLICATIONS

International Search Report of PCT/JP2018/037239 dated Dec. 25, 2018 [PCT/ISA/210].
Office Action of Taiwanese Application No. 107136128 dated Apr. 17, 2019.
Communication (Notice of Allowance) dated Dec. 16, 2019, from the Korean Intellectual Property Office in application No. 10-2019-7030540.
Communication dated Mar. 26, 2020 by the China National Intellectual Property Administration in application No. 201880028952.0.

* cited by examiner

*Primary Examiner* — Gary D Harris
(74) *Attorney, Agent, or Firm* — Sughrue Mion, PLLC

(57) ABSTRACT

The present invention provides an adhesive for laminating a metal foil and a resin film, including: (A) 1% to 20% by mass of polyurethane which has at least one functional group selected from the group consisting of a hydroxy group, an acryloyl group, and a carboxy group; (B) 30% to 90% by mass of a monomer which does not has an active hydrogen and has two or more ethylenically unsaturated bonds; (C) 1% to 55% by mass of an aliphatic monomer which has one ethylenically unsaturated bond; (D) 1% to 15% by mass of a polyisocyanate compound; and (E) 0.5% to 5% by mass of a photoinitiator. The (B) has a cyclic structure, and the (C) has a linear hydrocarbon group, a branched hydrocarbon group, or a cycloalkyl group.

15 Claims, No Drawings

ADHESIVE, LAMINATE, PACKAGING MATERIAL FOR BATTERY CASING, BATTERY CASE, AND METHOD OF PRODUCING BATTERY CASE

CROSS REFERENCE TO RELATED APPLICATIONS

This application is a National Stage of International Application No. PCT/JP2018/037239, filed Oct. 4, 2018, claiming priority to Japanese Patent Application No. 2017-220686, filed Nov. 16, 2017, the contents of all of which are incorporated herein by reference in their entirety.

TECHNICAL FIELD

The present invention relates to an adhesive for laminating a metal foil and a resin film, a laminate, a packaging material for a battery casing, a battery case, and a method of producing a battery case.

BACKGROUND ART

In recent years, miniaturization, weight reduction, and thickness reduction of electronic devices such as notebook computers and mobile phones have progressed. Accordingly, secondary storage batteries for electronic devices have been required to have improved performance, a lighter weight, and improved moving performance, and lithium ion batteries having a high energy density have been actively developed in place of lead storage batteries of the related art. Further, lithium ion batteries which can be used as power sources for electric vehicles or hybrid vehicles have come into practical use.

In a lithium ion battery, a compound containing lithium and a carbon material such as graphite or coke have been respectively used as a positive electrode material and a negative electrode material. Further, an electrolytic solution obtained by dissolving a lithium salt such as $LiPF_6$ or $LiBF_4$ as an electrolyte in an aprotic solvent having penetration capability such as propylene carbonate or ethylene carbonate or an electrolyte layer formed of a polymer gel impregnated with the electrolytic solution is provided between a positive electrode and a negative electrode.

In the related art, as a packaging material for a battery casing, a laminate obtained by sequentially laminating a heat-resistant resin stretched film layer and an aluminum foil layer serving as outer layers and a thermoplastic resin unstretched film layer serving as an inner layer has been known. In a battery case obtained using a packaging material for a battery casing having such a structure, in a case where a solvent having penetration capability such as an electrolytic solution passes through a film layer serving as a sealant in the packaging material for a battery casing, the laminate strength between the aluminum foil layer and the resin film layer is degraded and this may cause leakage of the electrolytic solution. Therefore, a packaging material for a battery casing obtained by bonding the aluminum foil layer and the inner layer through an adhesive layer that contains a polyfunctional isocyanate compound and a resin containing a functional group having reactivity with isocyanate such as an acid anhydride group, a carboxy group, or a hydroxy group has been developed.

For example, PTL 1 describes a method of forming an adhesive layer using a modified polyolefin resin obtained by grafting ethylenically unsaturated carboxylic acid or an anhydride thereof onto a homopolymer of propylene or a copolymer of propylene and ethylene and a solvent type adhesive obtained by dissolving or dispersing a polyfunctional isocyanate compound in an organic solvent.

In addition, PTL 2 describes an adhesive composition which contains polyolefin polyol and a polyfunctional isocyanate curing agent as indispensable components and to which a thermoplastic elastomer and/or a tackifier has been added. Further, PTL 3 describes an adhesive composition which contains one or more main agents selected from the group consisting of polyester polyol having a hydrophobic unit derived from a dimer fatty acid or a hydrogenated material thereof and an isocyanate elongation material of the polyester polyol; and a curing agent formed of one or more polyisocyanate compounds selected from the group consisting of crude tolylene diisocyanate, crude diphenylmethane diisocyanate, and polymeric diphenylmethane diisocyanate.

CITATION LIST

Patent Literature

[PTL 1] Japanese Unexamined Patent Application, First Publication No. 2010-92703
[PTL 2] Japanese Unexamined Patent Application, First Publication No. 2005-63685
[PTL 3] Japanese Unexamined Patent Application, First Publication No. 2011-187385

SUMMARY OF INVENTION

Technical Problem

However, the modified polyolefin resin described in PTL 1 changed with time during long-term storage or after dissolution in a solvent, and thus the operability at the time of application frequently becomes unstable. Further, there is a concern that the adhesive strength of an adhesive layer to be formed may vary. In addition, there is also a concern that the adhesive strength at a high temperature assuming use on vehicles is degraded.

The adhesive compositions described in PTLs 2 and 3 have relatively stabilized operability and adhesive strength at the time of application. However, there is a problem in that the adhesive strength is degraded in a case where the adhesive layer is brought into contact with the electrolytic solution having passed through the film layer serving as a sealant in the packaging material for a battery casing and the quality of the battery is degraded.

Further, the adhesives described in PTLs 1 to 3 have a problem in that it takes a long time to cure the adhesive layer at the time of bonding the aluminum foil layer and the film layer through the adhesive layer.

Therefore, an object of the present invention is to provide an adhesive for laminating a metal foil and a resin film which is cured in a short time and enables production of a packaging material for a battery casing with excellent heat resistance and electrolytic solution resistance. Further, another object of the present invention is to provide a laminate, a packaging material for a battery casing, and a battery case, with excellent heat resistance and electrolytic solution resistance which are produced using the adhesive.

Solution to Problem

The present invention includes the following aspects.
[1] An adhesive for laminating a metal foil and a resin film, including: (A) 1% to 20% by mass of polyurethane which has at least one functional group selected from the group consisting of a hydroxy group, an acryloyl group, and a carboxy group; (B) 30% to 90% by mass of a monomer which does not has an active hydrogen group and has two or more ethylenically unsaturated bonds; (C) 1% to 55% by mass of an aliphatic monomer which has one ethylenically unsaturated bond; (D) 1% to 15% by mass of a polyisocyanate compound; and (E) 0.5% to 5% by mass of a photoinitiator, in which the (B) has at least one cyclic structure selected from the group consisting of an alicyclic structure, an aromatic ring structure, and a heterocyclic structure, and the (C) has at least one group selected from the group consisting of an open chain hydrocarbon group having 1 to 12 carbon atoms and an alicyclic group having 5 to 10 carbon atoms.

[2] The adhesive according to [1], in which the (A) has at least one selected from the group consisting of polyurethane polyol (a1), polyurethane acrylate (a2), and carboxy group-containing polyurethane (a3).

[3] The adhesive according to [2], in which the polyurethane polyol (a1) is polyurethane polyol obtained by copolymerizing (1) polyol, (2) hydrocarbon having a saturated or unsaturated cyclic hydrocarbon structure and two or more hydroxy groups, and (3) polyisocyanate compound.

[4] The adhesive according to [3], in which the polyol is at least one selected from the group consisting of (1a) polyolefin polyol which does not have an alicyclic structure and (1b) polyester polyol which has a constitutional unit derived from a hydrogenated dimer acid and a constitutional unit derived from a hydrogenated dimer diol.

[5] The adhesive according to [2], in which the polyurethane acrylate (a2) is polyurethane acrylate obtained by copolymerizing (1) polyol, (2) hydrocarbon having a saturated or unsaturated cyclic hydrocarbon structure and two or more hydroxy groups, (3) polyisocyanate compound, and (4) (meth)acrylate having one or more hydroxy groups.

[6] The adhesive according to [2], in which the carboxy group-containing polyurethane (a3) is carboxy group-containing polyurethane obtained by copolymerizing (1) polyol, (2) hydrocarbon having a saturated or unsaturated cyclic hydrocarbon structure and two or more hydroxy groups, (3) polyisocyanate compound, and (5) compound having one or more hydroxy groups and one or more carboxy groups.

[7] The adhesive according to any one of [1] to [6], in which the (C) contains an aliphatic monomer (c1) containing an active hydrogen group and having one ethylenically unsaturated bond.

[8] The adhesive according to any one of [1] to [7], in which the (C) contains an aliphatic monomer (c2) containing phosphorus and having one ethylenically unsaturated bond.

[9] The adhesive according to [7] or [8], in which a ratio (NCO/active hydrogen) of the number of isocyanate groups contained in the (D) to the total number of active hydrogens contained in the (A) and the (c1) is 1.5 or greater.

[10] A laminate, in which a metal foil and a resin film are laminated by interposing an adhesive layer formed by curing the adhesive according to any one of [1] to [9] therebetween.

[11] The laminate according to [10], in which the metal foil is an aluminum foil, and the resin film includes a thermally fusible resin film.

[12] The laminate according to [10] or [11], in which a thickness of the metal foil is in a range of 10 to 100 μm, and a thickness of the resin film is in a range of 9 to 100 μm.

[13] A packaging material for a battery casing, including: the laminate according to any one of [10] to [12].

[14] A battery case comprising: the packaging material for a battery casing according to [13].

[15] A method of producing a battery case, including: performing deep drawing molding or stretch molding on the packaging material for a battery casing according to [13].

Advantageous Effects of Invention

According to the present invention, it is possible to provide an adhesive for laminating a metal foil and a resin film which is cured in a short time and enables production of a packaging material for a battery casing with excellent heat resistance and electrolytic solution resistance. Further, it is possible to provide a laminate, a packaging material for a battery casing, and a battery case, with excellent heat resistance and electrolytic solution resistance which are produced using the adhesive.

DESCRIPTION OF EMBODIMENTS

[Adhesive for Laminating Metal Foil and Resin Film]

According to an embodiment, the present invention provides an adhesive for laminating a metal foil and a resin film. The adhesive of the present embodiment includes (A) 1% to 20% by mass of polyurethane which contains at least one functional group selected from the group consisting of a hydroxy group, an acryloyl group, and a carboxy group; (B) 30% to 90% by mass of a monomer which does not contain an active hydrogen group and has two or more ethylenically unsaturated bonds; (C) 1% to 55% by mass of an aliphatic monomer which has one ethylenically unsaturated bond; (D) 1% to 15% by mass of a polyisocyanate compound; and (E) 0.5% to 5% by mass of a photoinitiator. The (B) has at least one cyclic structure selected from the group consisting of an alicyclic structure, an aromatic ring structure, and a heterocyclic structure. Further, the (C) contains at least one group selected from the group consisting of an open chain hydrocarbon group having 1 to 12 carbon atoms and an alicyclic group having 5 to 10 carbon atoms.

Hereinafter, the term "adhesive layer" indicates an adhesive layer obtained by curing the adhesive of the present embodiment.

<(A) Component>

The (A) component is polyurethane containing at least one functional group selected from the group consisting of a hydroxy group, an acryloyl group, and a carboxy group. The number average molecular weight of the polyurethane is preferably in a range of 1000 to 50000 and more preferably in a range of 3000 to 30000.

(Polyurethane Containing Hydroxy Group)

The polyurethane serving as the (A) component may be polyurethane containing a hydroxy group as a functional group (hereinafter, referred to as "hydroxy group-containing polyurethane"). Examples of the hydroxy group-containing polyurethane include polyurethane polyol (hereinafter, also referred to as "polyurethane polyol (a1)").

The polyurethane polyol (a1) can be obtained by copolymerizing (1) polyol, (2) hydrocarbon having a saturated or unsaturated cyclic hydrocarbon structure and two or more hydroxy groups, and (3) polyisocyanate compound. In other words, the polyurethane polyol (a1) can be a copolymer of (1) polyol, (2) hydrocarbon having a saturated or unsaturated cyclic hydrocarbon structure and two or more hydroxy groups, and (3) polyisocyanate compound.

(1) Polyol

It is preferable that the polyol is at least one selected from the group consisting of (1a) polyolefin polyol which does not have an alicyclic structure and (1b) polyester polyol which has a constitutional unit derived from a hydrogenated dimer acid and a constitutional unit derived from a hydrogenated dimer diol.

[(1a) Polyolefin Polyol which does not have Alicyclic Structure]

The polyolefin polyol which does not have an alicyclic structure is not particularly limited as long as the polyolefin polyol contains two or more hydroxy groups and a polyolefin skeleton obtained by polymerizing or copolymerizing one or two or more olefins and does not have an alicyclic structure. Examples of the polyolefin polyol which does not have an alicyclic structure include polydiene polyol such as polybutadiene polyol and polyisoprene polyol; graft polymers of these polydiene polyols and polyolefins; and hydrogenated materials such as the above-described polydiene polyols and graft polymers. These can be used alone or in the form of a mixture of two or more kinds thereof. From the viewpoint of the electrolytic solution resistance of the adhesive layer, it is preferable that the polyolefin polyol which does not have an alicyclic structure does not substantially have an unsaturated hydrocarbon structure in the structure. Preferred examples of the polyolefin polyol which does not have an alicyclic structure include hydrogenated materials of the above-described various polyolefin polyols. Examples of commercially available products of these materials include GI-1000, GI-2000, and GI-3000 (all manufactured by Nippon Soda Co., Ltd.), and EPOL (manufactured by Idemitsu Kosan Co., Ltd.).

The number average molecular weight of the polyolefin polyol which does not have an alicyclic structure is preferably in a range of 1000 to 10000. In a case where the number average molecular weight is 1000 or greater, the adhesive strength of the adhesive layer is unlikely to be degraded even in a case where the adhesive layer is brought into contact with the electrolytic solution. Further, in a case where the number average molecular weight is 10000 or less, the solubility of the polyurethane polyol (a1) becomes excellent, and the operability at the time of application of the adhesive also becomes excellent.

The number average molecular weight in the present specification is a value acquired by performing measurement at room temperature under the following conditions using a standard polystyrene calibration curve according to gel permeation chromatography (Shodex GPC System-11, "Shodex" (registered trademark), manufactured by Showa Denko K.K.).

Column: KF-806L, manufactured by Showa Denko K.K.
Column temperature: 40° C.
Sample: 0.2 mass % tetrahydrofuran solution containing sample polymer
Flow rate: 2 ml/min
Eluent: tetrahydrofuran
Detector: differential refractive index (RI)

[(1b) Polyester Polyol Having Constitutional Unit Derived from Hydrogenated Dimer Acid and Constitutional Unit Derived from Hydrogenated Dimer Diol]

In the present specification, the "dimer acid" indicates a dimer acid obtained by reacting a fatty acid having 14 to 22 carbon atoms which have 2 to 4 ethylenically unsaturated bonds with an unsaturated bond portion. In the present specification, the "hydrogenated dimer acid" indicates a saturated dicarboxylic acid obtained by hydrogenating a carbon-carbon double bond of the dimer acid. Examples of commercially available products of the hydrogenated dimer acid include EMPOL 1008 and EMPOL 1062 (both manufactured by BASF SE), and PRIPOL 1009 (manufactured by Croda Corporation).

In the present specification, the "hydrogenated dimer diol" indicates a hydrogenated dimer diol obtained by reducing at least one selected from the group consisting of the dimer acid, the hydrogenated dimer acid, and lower alcohol ester thereof in the presence of a catalyst and employing a diol component, in which a carboxylic acid moiety or a carboxylate moiety of the dimer acid is formed into an alcohol, as a main component. In a case where the above-described material has a carbon-carbon double bond, the double bond is further hydrogenated. Examples of commercially available products of the hydrogenated dimer diol include Sovermol 908 (manufactured by BASF SE) and PRIPOL 2033 (manufactured by Croda Corporation).

The polyester polyol having a constitutional unit derived from a hydrogenated dimer acid and a constitutional unit derived from a hydrogenated dimer diol can be produced by condensing an acid component containing the hydrogenated dimer acid as an indispensable component and a polyol component containing the hydrogenated dimer diol as an indispensable component in the presence of an esterification catalyst. Alternatively, the polyester polyol can be produced by carrying out transesterification of a lower alkyl ester of an acid containing a hydrogenated dimer acid as an indispensable component and a polyol component containing the hydrogenated dimer diol as an indispensable component in the presence of a transesterification catalyst.

(2) Hydrocarbon Having Saturated or Unsaturated Cyclic Hydrocarbon Structure and Two or More Hydroxy Groups The hydrocarbon having a saturated or unsaturated cyclic hydrocarbon structure and two or more hydroxy groups is not particularly limited as long as it is a compound having a saturated or unsaturated cyclic hydrocarbon structure and two or more hydroxy groups, and the structures of the other portions are composed of hydrocarbons.

Examples of the saturated cyclic hydrocarbon structure include a cycloalkane structure such as a cyclopentane ring, a cyclohexane ring, or a cycloheptane ring; and a saturated alicyclic structure having a crosslinked structure such as norbornane, adamantane, or tricyclodecane. Examples of the hydrocarbon having such a saturated cyclic hydrocarbon structure and two or more hydroxy groups include cycloalkanediol such as cyclopentanediol or cyclohexanediol; a saturated alicyclic diol having a crosslinked structure such as norbornanediol or adamantanediol; a saturated alicyclic triol having a crosslinked structure such as adamantane triol; and saturated alicyclic dimethanol such as cyclohexane dimethanol or tricyclodecane dimethanol. These may be used alone or in the form of a mixture of two or more kinds thereof. It is preferable that the hydrocarbon having a saturated cyclic hydrocarbon structure and two or more hydroxy groups has a saturated alicyclic structure having a crosslinked structure. Preferred examples thereof include norbornanediol, adamantanediol, adamantane triol, and tricyclodecane dimethanol. Examples of commercially available products of these include adamantane triols (manufactured by Idemitsu Kosan Co., Ltd. and Mitsubishi Gas Chemical Company, Inc.) and TCD Alcohol DM (manufactured by OXEA GmBH).

Examples of the unsaturated cyclic hydrocarbon structure include a cycloalkene ring such as a cyclopentene ring, a cyclohexene ring, a cycloheptene ring, or [4n] annulene; a conjugated ring structure such as benzene, naphthalene, anthracene, azulene, [4n+2] annulene; and an unsaturated alicyclic structure having a crosslinked structure such as dicyclopentadiene. Examples of the hydrocarbon having such an unsaturated cyclic hydrocarbon structure and two or more hydroxy groups include cyclohexenediol, biphenol, bisphenol, naphthalenediol, and dicyclopentadienyl dimethanol. These can be used alone or in the form of a mixture of two or more kinds thereof. As the hydrocarbon having an unsaturated cyclic hydrocarbon structure and two or more hydroxy groups, bisphenol is preferable. Specific preferred examples thereof include bisphenol A, bisphenol B, bisphenol C, bisphenol E, bisphenol F, bisphenol G, and bisphenol Z. Among these, bisphenol A is more preferable.

(3) Polyisocyanate Compound

The polyisocyanate compound is not particularly limited as long as the compound is a compound containing two or more isocyanate groups or a multimer thereof. Examples thereof include saturated alicyclic diisocyanate such as 1,4-cyclohexane diisocyanate, isophorone diisocyanate, methylene bis(4-cyclohexylisocyanate), 1,3-bis(isocyanatomethyl)cyclohexane, 1,4-bis(isocyanatomethyl)cyclohexane, or norbornane diisocyanate; aromatic diisocyanate such as 2,4-tolylene diisocyanate, 2,6-tolylene diisocyanate, diphenylmethane-4,4'-diisocyanate, 1,3-xylylene diisocyanate, or 1,4-xylylene diisocyanate; aliphatic diisocyanate such as hexamethylene diisocyanate, 2,4,4-trimethylhexamethylene diisocyanate, 2,2,4-trimethylhexane methylene diisocyanate; and allophanatized multimers, isocyanurated products, and biuret modified products of the above-described compounds. These can be used alone or in the form of a mixture of two or more kinds thereof.

As the polyisocyanate compound, saturated alicyclic diisocyanate is preferable. Specific preferred examples thereof include 1,4-cyclohexane diisocyanate, isophorone diisocyanate, methylene bis(4-cyclohexylisocyanate), 1,3-bis(isocyanatomethyl)cyclohexane, 1,4-bis(isocyanatomethyl)cyclohexane, and norbornane diisocyanate. Among these, isophorone diisocyanate, methylene bis(4-cyclohexylisocyanate), and norbornane diisocyanate are more preferable. Examples of commercially available products of these include DESMODUR I and DESMODUR W (both manufactured by Bayer AG), and IPDI and H12MDI (both manufactured by Degussa AG).

The (1) polyol, the (2) hydrocarbon having a saturated or unsaturated cyclic hydrocarbon structure and two or more hydroxy groups, and the (3) polyisocyanate compound can be copolymerized according to a known urethanization method. From the viewpoint of shortening the reaction time, it is preferable that the copolymerization is performed in the presence of a known urethanization catalyst such as dibutyltin dilaurate or dioctyltin dilaurate. For example, the method described in PCT International Publication No. WO2016/021279 can be used.

(Polyurethane Containing Acryloyl Group)

The polyurethane serving as the (A) component may be polyurethane containing an acryloyl group as a functional group (hereinafter, referred to as "acryloyl group-containing polyurethane"). Examples of the acryloyl group-containing polyurethane include polyurethane acrylate (hereinafter, also referred to as "polyurethane acrylate (a2)").

The polyurethane acrylate (a2) can be obtained by copolymerizing the (1) polyol, the (2) hydrocarbon having a saturated or unsaturated cyclic hydrocarbon structure and two or more hydroxy groups, the (3) polyisocyanate compound, and the (4) (meth)acrylate containing one or more hydroxy groups. In other words, the polyurethane acrylate (a2) can be a copolymer of the (1) polyol, the (2) hydrocarbon having a saturated or unsaturated cyclic hydrocarbon structure and two or more hydroxy groups, the (3) polyisocyanate compound, and the (4) (meth)acrylate containing one or more hydroxy groups.

Examples of the (1) polyol, the (2) hydrocarbon having a saturated or unsaturated cyclic hydrocarbon structure and two or more hydroxy groups, and the (3) polyisocyanate compound are the same as those described in the section of "(polyurethane containing hydroxy group)".

(4) (Meth)Acrylate Containing One or More Hydroxy Groups

In the present specification, the "(meth)acrylate" indicates methacrylate or acrylate.

The (meth)acrylate containing one or more hydroxy groups is not particularly limited as long as the (meth)acrylate contains one or more hydroxy groups and has a (meth)acrylate skeleton. Examples of the (meth)acrylate containing one or more hydroxy groups include hydroxyalkyl (meth)acrylate such as 2-hydroxyethyl (meth)acrylate, 2-hydroxypropyl (meth)acrylate, hydroxybutyl (meth)acrylate, hydroxypentyl (meth)acrylate, hydroxyhexyl (meth)acrylate, hydroxyoctyl (meth)acrylate, pentaerythritol tri-, di-, or mono(meth)acrylate, or trimethylolpropane di- or mono(meth)acrylate.

Among these, from the viewpoint of the reactivity, 2-hydroxyethyl (meth)acrylate or hydroxybutyl (meth)acrylate is preferable.

The (1) polyol, the (2) hydrocarbon having a saturated or unsaturated cyclic hydrocarbon structure and two or more hydroxy groups, the (3) polyisocyanate compound, and the (4) (meth)acrylate containing one or more hydroxy groups can be copolymerized according to a known method. From the viewpoint of shortening the reaction time, it is preferable that the copolymerization is performed in the presence of a known urethanization catalyst such as dibutyltin dilaurate or dioctyltin dilaurate.

(Polyurethane Containing Carboxy Group)

The polyurethane serving as the (A) component may be polyurethane containing a carboxy group as a functional group (hereinafter, referred to as "carboxy group-containing polyurethane"). Hereinafter, the carboxy group-containing polyurethane will also be referred to as "carboxy group-containing polyurethane (a3)".

The carboxy group-containing polyurethane can be obtained by copolymerizing the (1) polyol, the (2) hydrocarbon having a saturated or unsaturated cyclic hydrocarbon structure and two or more hydroxy groups, the (3) polyisocyanate compound, and the (5) compound containing one or more hydroxy groups and one or more carboxy groups. In other words, the carboxy group-containing polyurethane can be a copolymer of the (1) polyol, the (2) hydrocarbon having a saturated or unsaturated cyclic hydrocarbon structure and two or more hydroxy groups, the (3) polyisocyanate compound, and (5) compound containing one or more hydroxy groups and one or more carboxy groups.

Examples of the (1) polyol, the (2) hydrocarbon having a saturated or unsaturated cyclic hydrocarbon structure and two or more hydroxy groups, and the (3) polyisocyanate compound are the same as those described in the section of "(polyurethane containing hydroxy group)".

(5) Compound Containing One or More Hydroxy Groups and One or More Carboxy Groups The compound containing one or more hydroxy groups and one or more carboxy groups is not particularly limited as long as the compound contains one or more hydroxy groups and one or more carboxy groups. Examples of the compound containing one or more hydroxy groups and one or more carboxy groups include aliphatic hydroxy acid such as glycolic acid, 3-hydroxypropionic acid, 2-hydroxybutyric acid, 3-hydroxybutyric acid, 4-hydroxybutyric acid, 2,2-dimethylolpropionic acid, 2,2-dimethylolbutyric acid, maleic acid, or citric acid.

Among these, from the viewpoint of the reactivity, 2,2-dimethylolpropionic acid or 2,2-dimethylolbutyric acid is preferable.

The (1) polyol, the (2) hydrocarbon having a saturated or unsaturated cyclic hydrocarbon structure and two or more hydroxy groups, the (3) polyisocyanate compound, and the (5) compound containing one or more hydroxy groups and one or more carboxy groups can be copolymerized according to a known method. From the viewpoint of shortening the reaction time, it is preferable that the copolymerization is performed in the presence of a known urethanization catalyst such as dibutyltin dilaurate or dioctyltin dilaurate.

The content of the (A) component in the adhesive according to the present embodiment is in a range of 1% to 20% by mass. In a case where the content of the (A) component is in the above-described range, an adhesive layer with excellent electrolytic solution resistance can be formed. Further, an adhesive with excellent coatability can be obtained. The content of the (A) component in the adhesive according to the present embodiment is preferably in a range of 5% to 15% by mass.

The (A) component may be used alone or a combination of two or more kinds may be used.

<(B) Component>

The (B) component is a monomer which does not contain an active hydrogen group and has two or more ethylenically unsaturated bonds. The monomer of the (B) component has at least one cyclic structure selected from the group consisting of an alicyclic structure, an aromatic ring structure, and a heterocyclic structure.

In the present specification, the "active hydrogen group" indicates a group containing active hydrogen which can react with an isocyanate group, and specific examples thereof include a hydroxy group, a carboxy group, and an amino group.

The monomer serving as the (B) component is not particularly limited as long as the monomer has two or more ethylenically unsaturated bonds, does not have an active hydrogen group, and has at least one cyclic structure selected from the group consisting of an alicyclic structure, an aromatic ring structure, and a heterocyclic structure.

The ethylenically unsaturated bond in the (B) component is not particularly limited, but it is preferable that the ethylenically unsaturated bond is derived from the (meth) acryloyloxy group from the viewpoint of the reactivity. In other words, a polyfunctional acrylate monomer is preferable. The "(meth)acryloyloxy group" indicates an acryloyloxy group or a methacryloyloxy group.

Examples of the alicyclic structure which can be included in the monomer of the (B) component include a cycloalkane structure such as a cyclopentane ring, a cyclohexane ring, or a cycloheptane ring; and a saturated alicyclic structure having a crosslinked structure such as norbornane, adamantane, or tricyclodecane. Examples of the monomer which has such an alicyclic structure and two or more ethylenically unsaturated bonds without containing an active hydrogen group include tricyclodecane dimethanol diacrylate. Examples of commercially available products thereof include A-DCP (manufactured by Shin-Nakamura Chemical Co., Ltd.).

The aromatic ring structure which can be included in the monomer of the (B) component may be monocyclic or polycyclic, but a monocyclic aromatic ring structure such as a benzene ring is preferable. Examples of the monomer which has such an aromatic ring structure and two or more ethylenically unsaturated bonds without containing an active hydrogen group include bisphenol A diacrylate such as ethoxylated bisphenol A diacrylate or propoxylated bisphenol A diacrylate.

The heterocyclic structure which can be included in the monomer of the (B) component may be an aliphatic heterocycle or a heteroaromatic ring, but an aliphatic heterocycle is preferable. Examples of the aliphatic heterocycle include a dioxane ring and an isocyanurate ring. Examples of the monomer which has a dioxane ring and two or more ethylenically unsaturated bonds without containing an active hydrogen group include 2-[5-ethyl-5-[(acryloyloxy) methyl]-1,3-dioxane-2-yl]-2,2-dimethylethyl acrylate. Further, examples of the monomer which has an isocyanurate ring and two or more ethylenically unsaturated bonds without containing an active hydrogen group include ethoxylated isocyanuric acid triacrylate and ε-caprolactone-modified tris-(2-acryloxyethyl)isocyanurate.

Among these, from the viewpoint of the resistance to an electrolytic solution, it is preferable that the monomer has an alicyclic structure. Among examples of the alicyclic structure, tricyclodecane dimethanol diacrylate is more preferable.

The content of the (B) component in the adhesive according to the present embodiment is in a range of 30% to 90% by mass. In a case where the content of the (B) component is set to be in the above-described range, an adhesive layer with excellent heat resistance and electrolytic solution resistance can be formed. Further, an adhesive with excellent coatability can be obtained. The content of the (B) component in the adhesive according to the present embodiment is preferably in a range of 45% to 75% by mass.

The (B) component may be used alone or a combination of two or more kinds may be used.

<(C) Component>

The (C) component is an aliphatic monomer having one ethylenically unsaturated bond. The ethylenically unsaturated aliphatic monomer of the (C) component contains at least one group selected from the group consisting of an open chain hydrocarbon group having 1 to 12 carbon atoms and an alicyclic group having 5 to 10 carbon atoms.

The aliphatic monomer having one ethylenically unsaturated bond serving as the (C) component is not particularly limited as long as the aliphatic monomer is an aliphatic monomer that has one ethylenically unsaturated bond and has at least one group selected from the group consisting of an open chain hydrocarbon group having 1 to 12 carbon atoms and an alicyclic group having 5 to 10 carbon atoms.

Examples of the group having an ethylenically unsaturated bond which can be included in the aliphatic monomer having one ethylenically unsaturated bond of the (C) component include an acryloyl group. In the present specification, the "compound containing an acryloyl group" includes a compound containing an acrylamide group and a compound containing an acryloyloxy group.

The open chain hydrocarbon group having 1 to 12 carbon atoms which can be included in the aliphatic monomer having one ethylenically unsaturated bond of the (C) component may be linear or branched. Examples of the linear hydrocarbon group include a linear alkyl group and a linear alkylene group. Specific examples thereof include a methyl group, a methylene group, an ethyl group, an ethylene group, a propyl group, a propylene group, a butyl group, a butylene group, a pentyl group, a hexyl group, a heptyl group, an octyl group, a nonyl group, a decyl group, an undecyl group, and a dodecyl group. Examples of the branched hydrocarbon group include an isopropyl group, an isobutyl group, a sec-butyl group, a tort-butyl group, a pentyl group, an isopentyl group, a neopentyl group, an ethylhexyl group, and a branched nonyl group.

Examples of the alicyclic group having 5 to 10 carbon atoms which can be included in the aliphatic monomer having one ethylenically unsaturated bond of the (C) component include a cycloalkyl group such as a cyclopentyl group, a cyclohexyl group, a cycloheptyl group, or a cyclooctyl group; and an alicyclic group having a cross-linked structure such as an isobornyl group or a dicyclopentenyl group.

These open chain hydrocarbon groups or alicyclic groups may be formed such that one or more hydrogen atoms are substituted with substituents. Examples of the substituents include the above-described active hydrogen group and a phosphorus-containing group described below.

The (C) component contains at least one selected from the group consisting of an aliphatic monomer (c1) having an active hydrogen group and one ethylenically unsaturated bond, an aliphatic monomer (c2) having phosphorus and one ethylenically unsaturated bond, and an aliphatic monomer (c0) having one ethylenically unsaturated bond other than (c1) and (c2).

(Aliphatic Monomer (c0) Having One Ethylenically Unsaturated Bond Other than (c1) and (c2))

It is preferable that the (C) component contains the aliphatic monomer (c0) having one ethylenically unsaturated bond other than the aliphatic monomer (c1) having an active hydrogen group and one ethylenically unsaturated bond and the aliphatic monomer (c2) having phosphorus and one ethylenically unsaturated bond.

The (c0) component is an aliphatic monomer having one ethylenically unsaturated bond without containing an active hydrogen group and phosphorus. Specific examples of the (c0) component include aliphatic acrylate such as ethyl (meth)acrylate, propyl (meth)acrylate, butyl (meth)acrylate, pentyl (meth)acrylate, hexyl (meth)acrylate, heptyl (meth) acrylate, 2-ethylhexyl (meth)acrylate, nonyl (meth)acrylate, isononyl (meth)acrylate, branched nonyl (meth)acrylate, decyl (meth)acrylate, isodecyl (meth)acrylate, or lauryl (meth)acrylate; and alicyclic acrylate such as cyclohexyl (meth)acrylate, isobornyl (meth)acrylate, dicyclopentenyl (meth)acrylate, or dicyclopentanyl (meth)acrylate. These may be used alone or in the form of a mixture of two or more kinds thereof.

Among these, from the viewpoints of the electrolytic solution resistance and the reactivity, cyclohexyl acrylate or isobornyl acrylate is preferable.

(Aliphatic Monomer (c1) Having an Active Hydrogen Group and One Ethylenically Unsaturated Bond)

It is preferable that the (C) component contains the aliphatic monomer (c1) having an active hydrogen group and one ethylenically unsaturated bond. As the active hydrogen group contained in the (c1) component, a hydroxy group is preferable. Examples of the (c1) component include hydroxy group-containing acrylate and hydroxy group-containing acrylamide. Specific examples of the hydroxy group-containing acrylate include hydroxyalkyl (meth)acrylate such as 2-hydroxyethyl (meth)acrylate, 2-hydroxypropyl (meth)acrylate, hydroxybutyl (meth)acrylate, hydroxypentyl (meth)acrylate, hydroxyhexyl (meth)acrylate, or hydroxyoctyl (meth)acrylate. Specific examples of the hydroxy group-containing acrylamide include hydroxyalkyl acrylamide such as N-hydroxymethyl acrylamide or N-hydroxyethyl acrylamide. These may be used alone or in the form of a mixture of two or more kinds thereof.

Among these, from the viewpoint of the adhesiveness to a metal base material, N-hydroxyethyl acrylamide is preferable.

(Aliphatic Monomer (c2) Having Phosphorus and One Ethylenically Unsaturated Bond)

It is preferable that the (C) component contains the aliphatic monomer (c2) having phosphorus and one ethylenically unsaturated bond. As the phosphorus-containing group contained in the (c2) component, a phosphoric acid group is preferable. Examples of the (c2) component include an aliphatic monomer containing an acryloyloxy group and a phosphoric acid group. Specific examples of the aliphatic monomer having such a structure include (acryloyloxy)alkyl phosphate such as 2-acryloyloxyethyl acid phosphate or 2-acryloyloxybutyl acid phosphate. These may be used alone or in the form of a mixture of two or more kinds thereof.

The (C) component contains at least one selected from the group consisting of the (c0) component, the (c1) component, and the (c2) component, but it is preferable that the (C) component contains two or more components of these and more preferable that the (C) component contains all three components of these.

In a case where the (C) components contains the (c0) component and the (c1) component, the ratio (mass ratio) of the content (mass) of the (c0) component to the content (mass) of the (c1) component ((c0) component:(c1) component) is, for example, in a range of 50:1 to 1:1. Further, the ratio of the content of the (c0) component to the content of the (c1) component is preferably in a range of 30:1 to 5:1.

Further, in a case where the (C) component contains the (c0) component and the (c2) component, the ratio (mass ratio) of the content (mass) of the (c0) component to the content (mass) of the (c2) component ((c0) component:(c2) component) is, for example, in a range of 100:1 to 1:1. Further, the ratio of the content of the (c0) component to the content of the (c2) component is preferably in a range of 50:1 to 10:1.

Further, in a case where the (C) component contains the (c1) component and the (c2) component, the ratio (mass ratio) of the content (mass) of the (c1) component to the content (mass) of the (c2) component ((c1) component:(c2) component) is, for example, in a range of 5:1 to 1:5. Further, the ratio of the content of the (c1) component to the content of the (c2) component is preferably in a range of 3:1 to 1:3.

The content of the (C) component in the adhesive according to the present embodiment is in a range of 1% to 55% by mass. In a case where the content of the (C) component is set to be in the above-described range, an adhesive layer with excellent heat resistance and electrolytic solution resistance can be formed. Further, an adhesive with excellent coatability can be obtained. The content of the (C) component in the adhesive according to the present embodiment is preferably in a range of 10% to 30% by mass. The content of the (C) component described above is the total content of the (c0) component, the (c1) component, and the (c2) component.

<(D) Component>

(D) component is a polyisocyanate compound. The polyisocyanate compound serving as the (D) component is a compound containing two or more isocyanate groups or a multimer thereof and is not particularly limited as long as the (D) component does not correspond to the (A) component, the (B) component, or the (C) component. Examples of the polyisocyanate compound are the same as those for the polyisocyanate compound exemplified in the "<(A) component>(polyurethane containing hydroxy group) (3) polyisocyanate compound". Specific examples of the polyisocyanate compound as the (D) component include aliphatic diisocyanate such as hexamethylene diisocyanate, 2,4,4-trimethylhexamethylene diisocyanate, or 2,2,4-trimethylhexane methylene diisocyanate; saturated alicyclic diisocyanate such as 1,4-cyclohexane diisocyanate, isophorone diisocyanate, methylene bis(4-cyclohexylisocyanate), 1,3-bis(isocyanatomethyl)cyclohexane, 1,4-bis(isocyanatomethyl)cyclohexane, or norbornane diisocyanate; and aromatic diisocyanate such as tolylene diisocyanate, 4,4'-diphenylmethane diisocyanate, polymethylene polyphenyl isocyanate, xylylene diisocyanate, paraphenylene diisocyanate, or 1,5-naphthalene diisocyanate. Further, allophanatized multimers, isocyanurated products, and biuret-modified products of the above-described compounds are also exemplary examples. These may be used alone or in the form of a mixture of two or more kinds thereof.

Among these, from the viewpoint of the adhesiveness to a metal base material, an isocyanurated product of hexamethylene diisocyanate is preferable.

The content of the (D) component in the adhesive according to the present embodiment is in a range of 1% to 15% by mass. In a case where the content of the (D) component is set to be in the above-described range, an adhesive layer with excellent heat resistance and electrolytic solution resistance can be formed. The content of the (D) component in the adhesive according to the present embodiment is preferably in a range of 1% to 10% by mass.

<(E) Component>

(E) component is a photoinitiator. As the photoinitiator serving as the (E) component, a known photoradical polymerization initiator can be used without particular limitation. The photoradical polymerization initiator indicates a compound that generates a radical by irradiation with active energy rays such as ultraviolet rays, visible rays, or electron beams. As the photoinitiator serving as the (E) component, a photoradical polymerization initiator that generates a radical by irradiation with ultraviolet rays is preferable.

Specific examples of the (E) component include an aromatic ketone compound such as benzyl dimethyl ketal, benzyl, benzoin, benzoin ethyl ether, benzoin isopropyl ether, benzoin isobutyl ether, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, oligo[2-hydroxy-2-methyl-1-[4-1-(methylvinyl)phenyl]propanone, 2-hydroxy-1-[4-[4-(2-hydroxy-2-methyl-propionyl)-benzyl]-phenyl]-2-methylpropan-1-one, 2-methyl-1-[4-(methylthio)]phenyl]-2-morpholinopropan-1-one, 2-benzyl-2-dimethylamino-1-(4-morpholinophenyl)butan-1-one, 2-dimethylamino-2-(4-methylbenzyl)-1-(4-morpholin-4-yl-phenyl)-butan-1-one, ADEKA OPTOMER N-1414 (manufactured by Adeka Corporation), phenylglyoxylic acid methyl ester, ethyl anthraquinone, or phenanthrenequinone; a benzophenone-based compound such as benzophenone, 2-methylbenzophenone, 3-methylbenzophenone, 4-methylbenzophenone, 2,4,6-trimethylbenzophenone, 4-phenylbenzophenone, 4-(methylphenylthio)phenyl phenyl methane, methyl-2-benzophenone, 1-[4-(4-benzoyl-phenylsulfanyl)phenyl]-2-methyl-2-(4-methylphenylsulfonyl)propan-1-one, 4,4'-bis(dimethylamino)benzophenone, 4,4'-bis(diethylamino)benzophenone, N,N'-tetramethyl-4,4'-diaminobenzophenone, N,N'-tetraethyl-4,4'-diaminobenzophenone, or 4-methoxy-4'-dimethylaminobenzophenone; an acyl phosphine oxide compound such as bis(2,4,6-trimethylbenzoyl)-phenyl phosphine oxide, 2,4,6-trimethylbenzoyl diphenyl phosphine oxide, ethyl-(2,4,6-trimethylbenzoyl) phenyl phosphinate, or bis(2,6-dimethoxybenzoyl)-2,4,4-trimethylpentyl phosphine oxide; and a thioxanthone-based compound such as thioxanthone, 2-chlorothioxanthone, 2,4-diethylthioxanthone, isopropylthioxanthone, 1-chloro-4-propylthioxanthone, 3-[3,4-dimethyl-9-oxo-9H-thioxanthon-2-yl]oxyl-2-hydroxypropyl-N,N,N-trimethylammonium chloride, or fluorothioxanthone.

Among these, the acyl phosphine oxide compound such as bis(2,4,6-trimethylbenzoyl)-phenyl phosphine oxide, 2,4,6-trimethylbenzoyl diphenyl phosphine oxide, ethyl-(2,4,6-trimethylbenzoyl)phenyl phosphinate, or bis(2,6-dimethoxybenzoyl)-2,4,4-trimethylpentyl phosphine oxide is preferable from the viewpoint that the compound has excellent curability even in a case of being irradiated with an active energy ray through a film containing an ultraviolet absorbing agent and having low permeability.

The content of the (E) component in the adhesive according to the present embodiment is in a range of 0.5% to 5% by mass. In a case where the content of the (E) component is set to be in the above-described range, the curability of the adhesive becomes excellent. The content of the (E) component in the adhesive according to the present embodiment is preferably in a range of 1% to 3% by mass.

<Other Components>

The adhesive according to the present embodiment may contain other components in addition to the (A) to (E) components described above. Other components are not particularly limited, and examples thereof include a solvent, a reaction accelerator, a tackifier, a plasticizer, and ethylenically unsaturated monomers other than the (A) to (C) described above.

The adhesive according to the present embodiment may contain a solvent. The solvent is not particularly limited as long as the (A) to (E) components can be dissolved or dispersed in the solvent. Examples of the solvent include an aromatic organic solvent such as toluene or xylene; an alicyclic organic solvent such as cyclohexane, methyl cyclohexane, or ethylcyclohexane; an aliphatic organic solvent such as n-hexane or n-heptane, an ester-based organic solvent such as ethyl acetate, propyl acetate, or butyl acetate; and a ketone-based organic solvent such as acetone, methyl ethyl ketone, or methyl butyl ketone. These may be used alone or in the form of a mixture of two or more kinds thereof.

The adhesive according to the present embodiment may contain a reaction accelerator in order to accelerate the polymerization reaction of the (A) to (D) components. The reaction accelerator is not particularly limited, and a known agent can be used. Examples of the reaction accelerator include an organotin compound such as dioctyltin dilaurate or dioctyltin diacetate; a tertiary amine such as 2,4,6-tris(dimethylaminomethyl)phenol, dimethylaniline, dimethyl paratoluidine, or N,N-di(β-hydroxyethyl)-p-toluidine; and a neodecanoic acid metal such as zinc neodecanoate. These reaction accelerators may be used alone or a combination of two or more kinds may be used.

The adhesive according to the present embodiment may contain a tackifier. The tackifier is not particularly limited and a known agent can be used as the tackifier. Examples of the tackifier include natural resins such as a polyterpene-based resin or a rosin-based resin; and petroleum-based resins such as an aliphatic (C5) resin obtained from cracked oil fractions of naphtha, an aromatic (C9) resin, a copolymer (C5/C9) resin, and an alicyclic resin. Further, hydrogenated resins obtained by hydrogenating double bond portions of these resins are also exemplary examples. These tackifiers may be used alone or a combination of two or more kinds may be used.

The adhesive according to the present embodiment may contain a plasticizer. The plasticizer is not particularly limited, and examples thereof include liquid rubber such as polyisoprene or polybutene, and process oil.

The adhesive according to the present embodiment may contain a thermoplastic elastomer or a thermoplastic resin such as an acid-modified polyolefin resin as long as the effects of the present invention are not impaired. Examples of the thermoplastic resin and the thermoplastic elastomer include an ethylene-vinyl acetate copolymer resin, an ethylene-ethyl acrylate copolymer resin, styrene-ethylene-butylene-styrene (SEBS), and styrene-ethylene-propylene-styrene (SEPS).

The adhesive according to the present embodiment may contain an ethylenically unsaturated monomer other than the (A) to (C) components.

The adhesive according to the present embodiment can be produced by mixing the (A) to (E) components, appropriately adding other components thereto, and mixing the mixture.

In the adhesive according to the present embodiment, the ratio (NCO/active hydrogen) of the number of isocyanate groups contained in the (D) component to the total number of active hydrogens contained in the adhesive is preferably 1.5 or greater. The above-described ratio between NCO and active hydrogen is more preferably in a range of 1.5 to 5 and still more preferably in a range of 2.0 to 3.0. In a case where the adhesive according to the present embodiment does not contain the (c1) component as the (C) component, the number of active hydrogens contained in the (A) component can be considered as the number of active hydrogens contained in the adhesive.

In a case where the adhesive according to the present embodiment contains the (c1) component as the (C) component, the ratio (NCO/active hydrogen) of the number of isocyanate groups contained in the (D) component to the total number of active hydrogens contained in the (A) component and the (c1) component is preferably 1.5 or greater. The above-described ratio between NCO and active hydrogen is more preferably in a range of 1.5 to 5 and still more preferably in a range of 2.0 to 3.0.

In a case where the above-described ratio between NCO and active hydrogen is in the above-described range, an adhesive layer with excellent heat resistance and electrolytic solution resistance can be formed.

Herein, the "active hydrogen" indicates hydrogen which can react with an isocyanate group, among hydrogens contained in a hydroxy group, a carboxy group, and an amino group.

An adhesive layer with excellent electrolytic solution resistance can be formed using the adhesive according to the present embodiment. In a cured adhesive sheet obtained by curing the adhesive according to the present embodiment, the tensile strength obtained by immersing the cured adhesive sheet in a solvent of an electrolytic solution (ethylene carbonate/diethylene carbonate, mass ratio of 50/50) at 85° C. for 24 hours and then performing a tensile strength test under a test speed condition of 100 mm/min in an atmosphere of 23° C. at 50% RH is preferably 5 MPa or greater. The tensile strength under the above-described conditions is more preferably 10 MPa or greater. In the adhesive according to the present embodiment, the upper limit of the tensile strength under the above-described conditions is not particularly limited, but a value of 50 MPa or less or a value of 40 MPa or less is an exemplary example.

A method of preparing a cured adhesive sheet provided for the tensile strength test is as follows.

Both surfaces of a frame having a size of 40 mm×80 mm×300 µm are sandwiched with a release PET film, and a resin is injected to the inside thereof. The both surfaces are irradiated with ultraviolet rays having a UVA wavelength (320 to 390 nm) at an integrated light quantity of 6,000 mJ/cm$^2$ per one surface, the adhesive is cured by irradiating the both surfaces with ultraviolet rays at a total integrated light quantity of 12,000 mJ/cm$^2$, and the obtained adhesive resin cured product is cut into a shape with a size of 40 mm×15 mm×300 µm.

An adhesive layer having excellent coatability with respect to a metal foil and excellent heat resistance and electrolytic solution resistance can be formed between a metal foil and a resin film using the adhesive according to the present embodiment. Therefore, the adhesive can be suitably used for production of a packaging material for a battery casing such as a lithium ion battery.

[Laminate]

According to an embodiment, the present invention provides a laminate in which a metal foil and a resin film are laminated through an adhesive film formed by curing the adhesive according to the above embodiment (hereinafter, also simply referred to as the "present adhesive").

The laminate according to the present embodiment can be suitably used for production of a packaging material for a battery casing described below.

<Metal Foil>

A metal foil plays a role of a barrier with respect to water vapor or the like in the packaging material for a battery casing described below. As the metal foil having such a property, an aluminum foil is preferable. As the material for the aluminum foil, a pure aluminum-based O material (soft material) or an O material of an aluminum-iron-based alloy is typically used.

The thickness of the metal foil is not particularly limited, but is preferably in a range of 10 to 100 µm in order to ensure the processability and the barrier property of preventing infiltration of oxygen or moisture into the packaging material. In a case where the thickness of the metal foil is 10 µm or greater, breakage of the metal foil at the time of molding or occurrence of pinholes is suppressed.

Therefore, the risk of infiltration of oxygen or moisture into an inner layer is reduced in a case where the metal foil is used as the packaging material for a battery casing. In a case where the thickness of the metal foil is 100 µm or less, the thickness or the mass of the packaging material is maintained in an appropriate range at the time of using the metal foil as the packaging material for a battery casing. A metal foil having a thickness of 30 to 50 µm is typically used and a metal foil having a thickness of 40 to 50 µm is preferably used as the metal foil.

In order to improve the adhesiveness to the resin film and the corrosion resistance, the metal foil may be subjected to an undercoat treatment using a silane coupling agent or a titanium coupling agent or a chemical treatment such as a chromate treatment.

<Resin Film>

A resin film has a heat-sealing property in the packaging material for a battery casing described below and plays a role of improving the chemical resistance to an electrolytic solution or the like of a highly corrosive lithium secondary battery. As the resin film having such a property, a thermally fusible resin film is preferable. Examples of the material for the thermally fusible resin film include polypropylene, polyethylene, maleic acid-modified polypropylene, an ethylene-acrylate copolymer, and an ionomer resin. It is preferable that the resin film includes these thermally fusible resin films.

The thickness of the resin film is not particularly limited, but is preferably in a range of 9 to 100 μm, more preferably in a range of 20 to 80 μm, and still more preferably in a range of 40 to 80 μm. In a case where the thickness of the resin film is 9 μm or greater, sufficient heat-sealing strength is obtained and the corrosion resistance to an electrolytic solution or the like becomes excellent at the time of using the resin film as the packaging material for a battery casing. In a case where the thickness of the resin film is 100 μm or less, the strength of the packaging material is sufficient and the moldability becomes excellent at the time of using the resin film as the packaging material for a battery casing.

<Adhesive Layer>

An adhesive layer plays a role of bonding the metal foil and the resin film. The adhesive layer is obtained by irradiating the present adhesive with active energy rays such as ultraviolet rays and curing the present adhesive.

The thickness of the adhesive layer is not particularly limited as long as the adhesive layer is capable of bonding the metal foil and the resin film to each other, but is preferably in a range of 0.5 to 10 μm and more preferably in a range of 1 to 5 μm.

In a case where the metal foil and the resin film are laminated through the adhesive layer obtained from the present adhesive, the laminate according to the present embodiment may include a layer obtained by laminating metal foils and/or resin films through the adhesive layer obtained from the present adhesive. Examples of the laminate according to the present embodiment include a laminate formed by laminating the metal foil and the resin film through only the adhesive layer as well as a laminate having a layer other than the adhesive layer between the metal foil and the adhesive layer. For example, the laminate according to the present embodiment may include an intermediate resin layer described below between the metal foil and the adhesive layer.

The laminate according to the present embodiment can be produced by coating the surface of the metal foil with the present adhesive, laminating the resin film on the coated surface and pressure-bonding the metal foil and the resin film, irradiating the resultant with active energy rays such as ultraviolet rays, and curing the present adhesive. Alternatively, the laminate can be produced by coating the surface of the resin film with the present adhesive, laminating the metal foil on the coated surface and pressure-bonding the resin film and the metal foil, irradiating the resultant with active energy rays such as ultraviolet rays, and curing the present adhesive. In both methods, the laminate may be heated in a temperature range of 70° C. to 90° C. for about 1 hour after the irradiation with active energy rays.

The applications of the laminate according to the present embodiment are not particularly limited, and examples of suitable applications include packaging applications. Examples of the contents to be packaged by this laminate include liquid materials containing acids, alkalis, organic solvents, and the like, for example, solvent-based materials such as putty (such as thickening patty or thinning putty), paints (such as oil paints), lacquers (such as clear lacquers), and compounds for automobiles.

Further, this laminate can be suitably used as the packaging material for a battery casing because the laminate is suitable for packaging an electrolytic solution of a lithium ion battery. In a case where the laminate is used as the packaging material for a battery casing, it is preferable that the metal foil is an aluminum foil, the resin film includes a thermally fusible resin film, and an outer layer formed of a heat-resistant resin film is provided outside the aluminum foil.

[Packaging Material for Battery Casing]

According to an embodiment, the present invention provides a packaging material for a battery casing including the laminate (hereinafter, also simply referred to as the "present laminate") according to the above embodiment.

It is preferable that the packaging material for a battery casing according to the present embodiment is provided with an outer layer formed of a heat-resistant resin film outside the metal foil of the present laminate. Further, as necessary, the packaging material for a battery casing can be configured such that a first intermediate resin layer and/or a second intermediate resin layer is added in order to improve the characteristics such as the mechanical strength or the electrolytic solution resistance. Specific examples of the preferable forms include the following configurations (1) to (8). In the following configurations, the metal foil layer, the adhesive layer, and the resin film layer are the same as those in the present laminate.

(1) Outer layer/metal foil layer/adhesive layer/resin film layer (2) Outer layer/first intermediate resin layer/metal foil layer/adhesive layer/resin film layer (3) Outer layer/metal foil layer/second intermediate resin layer/adhesive layer/resin film layer (4) Outer layer/first intermediate resin layer/metal foil layer/second intermediate resin layer/adhesive layer/resin film layer (5) Coating layer/outer layer/metal foil layer/adhesive layer/resin film layer (6) Coating layer/outer layer/first intermediate resin layer/metal foil layer/adhesive layer/resin film layer (7) Coating layer/outer layer/metal foil layer/second intermediate resin layer/adhesive layer/resin film layer (8) Coating layer/outer layer/first intermediate resin layer/metal foil layer/second intermediate resin layer/adhesive layer/resin film layer (Outer Layer)

It is preferable that a resin film with excellent heat resistance, moldability, and insulation properties is used as the outer layer.

For example, a stretched film of a polyamide (nylon) resin or a polyester resin is typically used.

The thickness of the resin film of the outer layer is preferably in a range of 9 to 50 μm. In a case where the thickness of the resin film of the outer layer is less than 9 μm, stretch in a stretched film may become insufficient at the time of molding the packaging material, and necking may occur in the metal foil (an aluminum foil or the like), and molding defects tend to occur. In addition, in a case where the thickness of the resin film of the outer layer is greater than 50 μm, the effects of the moldability are not significantly improved and the volume energy density is decreased. The thickness of the resin film of the outer layer is more preferably in a range of 10 to 40 μm and still more preferably in a range of 20 to 30 μm.

It is preferable that a resin film in which the tensile strength thereof is 150 N/mm$^2$ or greater, preferably 200 N/mm$^2$ or greater, and still more preferably 250 N/mm$^2$ or greater and the stretch due to the tension in three directions is 80% or greater, preferably 100% or greater, and more preferably 120% or greater is used as the resin film of the outer layer from the viewpoint of obtaining a sharper shape: the tensile strength and the stretch due to the tension in three directions is obtained by cutting the resin film into a predetermined size such that each of three directions of 0°, 45°, and 90° becomes a tensile direction when setting the stretching direction of the stretched film to 0°, and performing a tensile test using the resin film. In a case where the tensile strength is 150 N/mm² or greater or the stretch due to the tension is 80% or greater, the above effects are sufficiently exhibited. The value of the tensile strength and the stretch due to the tension is a value up to breakage in the tensile test (a test piece having a length of 150 mm, a width of 15 mm, and a thickness of 9 to 50 μm is used, and the tensile speed is 100 mm/min) performed on the film. The test piece is cut out in each of three directions.

(First Intermediate Resin Layer and Second Intermediate Resin Layer)

As the first intermediate resin layer, a polyamide resin, a polyester resin, a polyethylene resin, or the like is used for the purpose of improving the mechanical strength of the packaging material for a battery casing. The first intermediate resin layer may be any of a single-layer resin film and a multi-layer resin film (produced by coextrusion of two layers or coextrusion of three layers).

As the second intermediate resin layer, a polyamide resin, a polyester resin, or a polyethylene resin similarly to the first intermediate resin layer or a thermally adhesive extrusion resin such as polypropylene is used for the purpose of mainly improving the electrolytic solution resistance. The second intermediate resin layer may be any of a single-layer resin film and a multi-layer resin film.

The thickness of the first intermediate resin layer and the second intermediate resin layer is not particularly limited, but is typically in a range of 0.1 to 30 μm in a case where these layers are provided.

(Coating Layer)

The packaging material for a battery casing according to the present embodiment may be provided with a coating layer on the outer layer. Examples of a method of forming the coating layer include a method of coating the outer layer with a polymer having a gas barrier property, and a method of depositing an aluminum metal or an inorganic oxide such as silicon oxide or aluminum oxide on the outer layer and coating the outer layer with a thin film of a metal and an inorganic material. A packaging material for a battery casing with excellent barrier properties to water vapor and other gas is obtained by providing the coating layer.

The packaging material for a battery casing according to the present embodiment has excellent electrolytic solution resistance, heat resistance, and barrier properties to water vapor and other gas and is suitably used for producing a battery case for a secondary battery and particularly for a lithium ion battery.

[Battery Case]

According to an embodiment, the present invention provides a battery case including the packaging material for a battery casing (hereinafter, also simply referred to as the "present packaging material for a battery casing") according to the embodiment.

The battery case according to the present embodiment can be produced by molding the present packaging material for a battery casing. Since the present packaging material for a battery casing has excellent moldability, the battery case according to the present embodiment can be easily obtained by molding the packaging material for a battery casing using a known method. The molding method is not particularly limited, and a battery case having a complicated shape or high dimension accuracy can be prepared by performing molding according to deep drawing molding or stretch molding. The present invention also provides a method of producing a battery case including performing deep drawing molding or stretch molding on the present packaging material for a battery casing.

The battery case according to the present embodiment has excellent electrolytic solution resistance, heat resistance, and barrier properties to water vapor and other gas and is suitably used as a battery case for a secondary battery and particularly for a lithium ion battery.

EXAMPLES

Hereinafter, the present invention will be described in more detail based on examples and comparative examples, but the present invention is not limited to these examples.

(Synthesis Example 1) Synthesis of Polyurethane Polyol (a1-1)

138.7 g of GI-1000 (hydrogenated polybutadiene polyol, manufactured by Nippon Soda Co., Ltd.), 15.4 g of TCD Alcohol DM (tricyclodecane dimethanol, manufactured by OXEA GmBH), 36.5 g of DESMODUR W (methylene bis(4-cyclohexylisocyanate), manufactured by Bayer AG), 190.6 g of VISCOAT #155 (cyclohexyl acrylate, manufactured by Osaka Organic Chemical Industry Ltd.), 0.19 g of hydroquinone monomethyl ether (manufactured by Wako Pure Chemical Industries, Ltd.), and 0.04 g of KS-1260 (dibutyltin dilaurate, manufactured by Sakai Chemical Industry Co., Ltd.) were added to a reaction container provided with a stirrer, a thermometer, and a condenser, and the solution was heated to 80° C. to 85° C. using an oil bath while being stirred. Thereafter, the reaction was continued while the solution was stiffed for 2.5 hours, thereby obtaining a cyclohexyl acrylate solution (50% wt) of hydroxy group-containing polyurethane (a1-1). The theoretical amount of the hydroxy group in the polyurethane polyol (a1-1) acquired from the raw materials is 0.258 mmol/g (solid content).

(Synthesis Example 2) Synthesis of Polyurethane Polyol (a1-2)

138.7 g of GI-1000 (hydrogenated polybutadiene polyol, manufactured by Nippon Soda Co., Ltd.), 15.4 g of TCD Alcohol DM (tricyclodecane dimethanol, manufactured by OXEA GmBH), 36.5 g of DESMODUR W (methylene bis(4-cyclohexylisocyanate), manufactured by Bayer AG), 95.3 g of VISCOAT #155 (cyclohexyl acrylate, manufactured by Osaka Organic Chemical Industry Ltd.), 95.3 g of IBXA (isobornyl acrylate, manufactured by Osaka Organic Chemical Industry Ltd.), 0.19 g of hydroquinone monomethyl ether (manufactured by Wako Pure Chemical Industries, Ltd.), and 0.04 g of KS-1260 (dibutyltin dilaurate, manufactured by Sakai Chemical Industry Co., Ltd.) were added to a reaction container provided with a stirrer, a thermometer, and a condenser, and the solution was heated to 80° C. to 85° C. using an oil bath while being stirred. Thereafter, the reaction was continued while the solution was stirred for 2.5 hours, thereby obtaining a cyclohexyl acrylate/isobornyl acrylate solution (50 wt %) of polyurethane polyol (a1-2). The theoretical amount of the hydroxy group in the polyurethane polyol (a1-2) acquired from the raw materials is 0.258 mmol/g (solid content).

(Synthesis Example 3) Synthesis of Polyurethane Polyol (a1-3)

142.5 g of Priplast 3197 (hydrogenated dimer acid polyester polyol, manufactured by Croda Corporation), 13.6 g of TCD Alcohol DM (tricyclodecane dimethanol, manufactured by OXEA GmBH), 31.4 g of DESMODUR W (methylene bis(4-cyclohexylisocyanate), manufactured by Bayer AG), 93.8 g of VISCOAT #155 (cyclohexyl acrylate, manufactured by Osaka Organic Chemical Industry Ltd.), 93.8 g of IBXA (isobornyl acrylate, manufactured by Osaka Organic Chemical Industry Ltd.), 0.19 g of hydroquinone monomethyl ether (manufactured by Wako Pure Chemical Industries, Ltd.), and 0.04 g of KS-1260 (dibutyltin dilaurate, manufactured by Sakai Chemical Industry Co., Ltd.) were added to a reaction container provided with a stirrer, a thermometer, and a condenser, and the solution was heated to 80° C. to 85° C. using an oil bath while being stirred. Thereafter, the reaction was continued while the solution was stirred for 2.5 hours, thereby obtaining a cyclohexyl acrylate/isobornyl acrylate solution (50 wt %) of polyurethane polyol (a1-3). The theoretical amount of the hydroxy group in the polyurethane polyol (a1-3) acquired from the raw materials is 0.261 mmol/g (solid content).

(Synthesis Example 4) Synthesis of Polyurethane Acrylate (a2-1)

122.4 g of G1-1000 (hydrogenated polybutadiene polyol, manufactured by Nippon Soda Co., Ltd.), 13.6 g of TCD Alcohol DM (tricyclodecane dimethanol, manufactured by OXEA GmBH), 44.2 g of DESMODUR W (methylene bis(4-cyclohexylisocyanate), manufactured by Bayer AG), 92.9 g of VISCOAT #155 (cyclohexyl acrylate, manufactured by Osaka Organic Chemical Industry Ltd.), 92.9 g of IBXA (isobornyl acrylate, manufactured by Osaka Organic Chemical Industry Ltd.), 0.19 g of hydroquinone monomethyl ether (manufactured by Wako Pure Chemical Industries, Ltd.), and 0.04 g of KS-1260 (dibutyltin dilaurate, manufactured by Sakai Chemical Industry Co., Ltd.) were added to a reaction container provided with a stirrer, a thermometer, and a condenser, and the solution was heated to 80° C. to 85° C. using an oil bath while being stirred. Then, the reaction was continued while the solution was stirred for 2.5 hours. Thereafter, 5.6 g of HEA (2-hydroxyethyl acrylate, manufactured by Osaka Organic Chemical Industry Ltd.) was added thereto, the reaction was continued while the solution was stirred for 2.5 hours, thereby obtaining a cyclohexyl acrylate/isobornyl acrylate solution (50 wt %) of polyurethane acrylate (a2-1). The theoretical amount of the hydroxy group in the polyurethane acrylate (a2-1) acquired from the raw materials is 0 mmol/g (solid content).

(Synthesis Example 5) Synthesis of Polyurethane Polyol (a1-4)

138.7 g of GI-1000 (hydrogenated polybutadiene polyol, manufactured by Nippon Soda Co., Ltd.), 15.4 g of TCD Alcohol DM (tricyclodecane dimethanol, manufactured by OXEA GmBH), 28.7 g of COSMONATE NBDI (norbornane diisocyanate, manufactured by Mitsui Chemicals, Inc.), 182.8 g of VISCOAT #155 (cyclohexyl acrylate, manufactured by Osaka Organic Chemical Industry Ltd.), 0.18 g of hydroquinone monomethyl ether (manufactured by Wako Pure Chemical Industries, Ltd.), and 0.04 g of KS-1260 (dibutyltin dilaurate, manufactured by Sakai Chemical Industry Co., Ltd.) were added to a reaction container provided with a stirrer, a thermometer, and a condenser, and the solution was heated to 80° C. to 85° C. using an oil bath while being stirred. Thereafter, the reaction was continued while the solution was stirred for 2.5 hours, thereby obtaining a cyclohexyl acrylate solution (50 wt %) of a hydroxy group-containing polyurethane (a1-4). The theoretical amount of the hydroxy group in the polyurethane polyol (a1-4) acquired from the raw materials is 0.269 mmol/g (solid content).

The raw materials used in Synthesis Examples 1 to 5 are as follows.
GI-1000: hydrogenated polybutadiene polyol, manufactured by Nippon Soda Co., Ltd. (theoretical amount of hydroxy group: 1.23 mmol/g)
Priplast 3197: hydrogenated dimer acid polyester polyol, manufactured by Croda Corporation (theoretical amount of hydroxy group: 1.05 mmol/g)
TCD Alcohol DM: tricyclodecane dimethanol, manufactured by OXEA GmBH (theoretical amount of hydroxy group: 10.2 mmol/g)
DESMODUR W: methylene bis(4-cyclohexylisocyanate), manufactured by Bayer AG (NCO content: 7.63 mmol/g)
COSMONATE NBDI (norbornane diisocyanate, manufactured by Mitsui Chemicals, Inc. (NCO content: 9.71 mmol/g)
HEA: 2-hydroxyethyl acrylate, manufactured by Osaka Organic Chemical Industry Ltd. (theoretical amount of hydroxy group: 8.62 mmol/g)
Hydroquinone monomethyl ether: manufactured by Wako Pure Chemical Industries, Ltd.
KS-1260: dibutyltin dilaurate, manufactured by Sakai Chemical Industry Co., Ltd.

Example 1

An adhesive composition for laminating a metal foil and a resin film was prepared by adding 14.5 g (solid content) of the polyurethane polyol (a1-1) synthesized in Synthesis Example 1 as the (A) component, 54.0 g of NK Ester A-DCP (tricyclopentane dimethanol diacrylate, manufactured by Shin-Nakamura Chemical Co., Ltd.) as the (B) component, 20.0 g of VISCOAT #155 (including the acryl monomer in the polyurethane polyol solution) as the (c0) component in the (C) component, 1.4 g of HEAA (N-hydroxyethylacrylamide, manufactured by KJ Chemicals Corporation) as the (c1) component, 1.4 g of Light Acrylate P-1A (2-acryloyloxyethyl acid phosphate, manufactured by Kyoeisha Chemical Co., Ltd.) as the (c2) component, 5.7 g of DURANATE TKA-100 (isocyanurate product of hexamethylene diisocyanate, manufactured by Asahi Kasei Corporation) as the (D) component, 2.7 g of SB-PI 718 (2,4,6-trimethylbenzoyl diphenyl phosphine oxide, manufactured by SHUANG-BANG INDUSTRIAL Corporation) as the (E) component, and 0.3 g of BiCAT Z (zinc neodecanoate, manufactured by Shepherd Chemical Company).

Examples 2 to 9 and Comparative Examples 1 to 6

Adhesive compositions of Examples 2 to 9 and Comparative Examples 1 to 6 were prepared in the same manner as in Example 1 except that the raw materials listed in Table 1 were blended.
<NCO/Active Hydrogen Ratio>
The ratio of NCO/active hydrogen in each adhesive composition of Examples 1 to 9 and each adhesive composition of Comparative Examples 1 to 6 was acquired based on the following equation. In the present specification, the "active hydrogen" indicates hydrogen which can react with an isocyanate group among hydrogens contained in a hydroxy group, a carboxy group, or an amino group.

Ratio of NCO/active hydrogen=(number of NCO groups in (D) component)/(total number of active hydrogens in (A) component and (c1) component) [Math. 1]

[Production of Packaging Material for Battery Casing]

A packaging material for a battery casing having the following configuration: an outer layer/an adhesive layer for an outer layer/an aluminum foil layer/an adhesive layer for an inner layer/an inner layer (resin film layer), was produced using each adhesive composition of Examples 1 to 9 and Comparative Examples 1 to 6 according to a dry lamination method.

Outer layer: stretched polyamide film (thickness of 25 μm)

Adhesive for outer layer: urethane-based adhesive for dry laminate (manufactured by Toyo-Morton, Ltd., AD502/CAT10, coating amount of 3 g/m² (at the time of coating))

Aluminum foil layer: aluminum foil of aluminum-iron-based alloy (AA standard 8079-0 material, thickness of 40 μm)

Adhesive for inner layer: each adhesive composition of Examples 1 to 9 and Comparative Examples 1 to 6 (coating amount: thickness of 2 μm)

Inner layer: unstretched polypropylene film (thickness of 40 μm)

<Method of Laminating Metal Foil and Resin Film>

An aluminum foil layer in a laminate having a configuration of an outer layer/an adhesive layer for an outer layer/an aluminum foil layer was coated with an adhesive composition using a bar coater such that the thickness thereof was set to 2 μm, and an unstretched polypropylene film for an inner layer material was bonded thereonto using a roll press at 80° C. Thereafter, an adhesive composition was cured by being irradiated with ultraviolet rays. After the composition was cured, the composition was heated by being allowed to stand in an atmosphere of 80° C. for 1 hour. The UV irradiation was carried out under the following conditions.

UV irradiation device: using LH6, D valve, manufactured by Heraeus Holding GmbH

Irradiation intensity: 2400 mW/cm² (UVA 320 to 390 nm), conveyor speed of 10 m/min Integrated light quantity of 600 mJ/cm²

[Measurement of Peel Strength]

The normal T-shape peel strength, the T-shape peel strength in an atmosphere of 85° C., and the T-shape peel strength after immersion in a solvent of an electrolytic solution were measured using each packaging material for a battery casing prepared using each adhesive composition of Examples 1 to 9 and Comparative Examples 1 to 6. The measurement was performed according to the following conditions and methods (1) to (3) described below.

(1) Normal T-Shape Peel Strength

Using a test piece having a length of 150 mm and a width of 15 mm and Autograph AG-X (manufactured by Shimadzu Corporation), 180° peel strength between the aluminum foil layer and the unstretched polypropylene film layer was measured by performing peeling at a test speed of 100 mm/min in an atmosphere of 23° C. at 50% RH.

(2) T-Shape Peel Strength in Atmosphere of 85° C.

Using a test piece having a length of 150 mm and a width of 15 mm and Autograph AG-X (manufactured by Shimadzu Corporation), 180° peel strength between the aluminum foil layer and the unstretched polypropylene film layer was measured by performing peeling at a test speed of 100 mm/min after allowing the test piece to stand in an atmosphere of 85° C. until the temperature of the test piece reached 85° C.

(3) T-shape peel strength after immersion in solvent of electrolytic solution

180° peel strength between the aluminum foil layer and the unstretched polypropylene film layer was measured in the same manner as in (1) described above, after immersing a test piece having a length of 150 mm and a width of 15 mm in a solvent of an electrolytic solution (ethylene carbonate/diethyl carbonate, mass ratio of 50/50), allowing the test piece to stand in an atmosphere of 85° C. for 24 hours, and taking the test piece out.

[Measurement of Coating Strength after Immersion in Solvent of Electrolytic Solution]

In order to measure the coating strength of each adhesive composition of Examples 1 to 9 and Comparative Examples 1 to 6 after immersion in a solvent of an electrolytic solution, a cured adhesive sheet was prepared using the adhesive composition.

The tensile strength was measured in an atmosphere of 23° C. at 50% RH and a test speed of 100 mm/min after immersing a test piece having a length of 40 mm and a width of 15 mm of the prepared cured adhesive sheet in a solvent of an electrolytic solution (ethylene carbonate/diethyl carbonate, mass ratio of 50/50), allowing the test piece to stand in an atmosphere of 85° C. for 24 hours, and taking the test piece out.

<Method of Preparing Test Piece of Cured Adhesive Sheet>

The cured adhesive sheet used as the test piece for measuring the coating strength was prepared according to the following method.

Both surfaces of a frame having a size of 40 mm×80 mm×300 μm were sandwiched with a release PET film, and each adhesive composition of Examples 1 to 9 and Comparative Examples 1 to 6 was injected to the inside thereof. The both surfaces were irradiated with ultraviolet rays ten times (integrated light quantity of 6000 mJ/cm²) for each surface at an irradiation intensity of 2400 mW/cm² and a conveyor speed of 10 m/min, and the adhesive composition was cured by irradiating with ultraviolet rays at a total integrated light quantity of 12000 mJ/cm². The obtained adhesive cured product was cut into a shape with a size of 40 mm×15 mm×300 μm and used as a test piece for measuring the coating strength.

[Results]

The measurement results of the peel strength and the coating strength are listed in Tables 1 to 3.

TABLE 1

| Composition (unit: % by mass) | | | Example 1 | Example 2 | Example 3 | Example 4 |
| --- | --- | --- | --- | --- | --- | --- |
| A component (solid content) | a1 | a1-1 | 14.5 | — | — | — |
| | | a1-2 | — | 14.5 | — | — |
| | | a1-3 | — | — | 14.5 | — |
| | | a1-4 | — | — | — | — |
| | a2 | a2-1 | — | — | — | 14.5 |

TABLE 1-continued

| Composition (unit: % by mass) | | Example 1 | Example 2 | Example 3 | Example 4 |
|---|---|---|---|---|---|
| B component | A-DCP | 54 | 54 | 54 | 54 |
| C component c0 | VISCOAT #155 | 20 | 10 | 10 | 10 |
| | IBXA | — | 10 | 10 | 10 |
| c1 | HEAA | 1.4 | 1.4 | 1.4 | 1.4 |
| c2 | P-1A | 1.4 | 1.4 | 1.4 | 1.4 |
| D component | TKA-100 | 5.7 | 5.7 | 5.7 | 5.7 |
| E component | SB-PI 718 | 2.7 | 2.7 | 2.7 | 2.7 |
| Other components | BiCAT Z | 0.3 | 0.3 | 0.3 | 0.3 |
| | A-400 | — | — | — | — |
| | EBECRYL 600 | — | — | — | — |
| Total | | 100 | 100 | 100 | 100 |
| Ratio of NCO/active hydrogen | | 2.1 | 2.1 | 2.1 | 2.8 |
| T-shape peel strength (N/15 mm) | Normal | 15.1 | 16.0 | 16.4 | 15.3 |
| | In atmosphere of 85° C. | 6.3 | 7.2 | 6.8 | 6.2 |
| | After immersion in solvent of electrolytic solution | 9.6 | 10.0 | 8.9 | 8.0 |
| After immersion in solvent of electrolytic solution Coating strength (MPa) | | 16.1 | 16.6 | 12.2 | 16.7 |

TABLE 2

| Composition (unit: % by mass) | | | Example 5 | Example 6 | Example 7 | Example 8 | Example 9 |
|---|---|---|---|---|---|---|---|
| A component (solid content) | a1 | a1-1 | 20 | 4 | 10 | 14.5 | — |
| | | a1-2 | — | — | — | — | — |
| | | a1-3 | — | — | — | — | — |
| | | a1-4 | — | — | — | — | 14.5 |
| | a2 | a2-1 | — | — | — | — | — |
| B component | | A-DCP | 50 | 80 | 30 | 52.4 | 54 |
| C component | c0 | VISCOAT #155 | 18.5 | 4.5 | 48.5 | 14.5 | 20 |
| | | IBXA | — | — | — | — | — |
| | c1 | HEAA | 1.4 | 1.4 | 1.4 | 2.8 | 1.4 |
| | c2 | P-1A | 1.4 | 1.4 | 1.4 | 1.4 | 1.4 |
| D component | | TKA-100 | 5.7 | 5.7 | 5.7 | 11.4 | 5.7 |
| E component | | SB-PI 718 | 2.7 | 2.7 | 2.7 | 2.7 | 2.7 |
| Other components | | BiCAT Z | 0.3 | 0.3 | 0.3 | 0.3 | 0.3 |
| | | A-400 | — | — | — | — | — |
| | | EBECRYL 600 | — | — | — | — | — |
| Total | | | 100 | 100 | 100 | 100 | 100 |
| Ratio of NCO/active hydrogen | | | 2.0 | 2.6 | 2.3 | 2.4 | 2.1 |
| T-shape peel strength (N/15 mm) | | Normal | 15.0 | 14.5 | 14.6 | 15.0 | 15.4 |
| | | In atmosphere of 85° C. | 6.4 | 5.4 | 5.8 | 6.3 | 5.4 |
| | | After immersion in solvent of electrolytic solution | 8.4 | 9.5 | 7.8 | 8.7 | 9.2 |
| After immersion in solvent of electrolytic solution Coating strength (MPa) | | | 11.8 | 31.8 | 5.2 | 15.6 | 15.6 |

TABLE 3

| Composition (unit: % by mass) | | | Comparative Example 1 | Comparative Example 2 | Comparative Example 3 | Comparative Example 4 | Comparative Example 5 | Comparative Example 6 |
|---|---|---|---|---|---|---|---|---|
| A component (solid content) | a1 | a1-1 | — | 20 | 15.3 | 14.5 | 14.5 | 30 |
| | | a1-2 | — | — | — | — | — | — |
| | | a1-3 | — | — | — | — | — | — |
| | | a1-4 | — | — | — | — | — | — |
| | a2 | a2-1 | — | — | — | — | — | — |
| B component | | A-DCP | 75 | 54 | 26.5 | — | — | 50 |
| C component | c0 | VISCOAT #155 | 13.5 | 20.5 | 22.8 | 20 | 20 | 8.5 |
| | | IBXA | — | — | 23.3 | — | — | — |
| | c1 | HEAA | 1.4 | 1.4 | 1.5 | 1.4 | 1.4 | 1.4 |
| | c2 | P-1A | 1.4 | 1.4 | 1.5 | 1.4 | 1.4 | 1.4 |
| D component | | TKA-100 | 5.7 | — | 6.0 | 5.7 | 5.7 | 5.7 |
| E component | | SB-PI 718 | 2.7 | 2.7 | 2.9 | 2.7 | 2.7 | 2.7 |

TABLE 3-continued

| Composition (unit: % by mass) | | Comparative Example 1 | Comparative Example 2 | Comparative Example 3 | Comparative Example 4 | Comparative Example 5 | Comparative Example 6 |
|---|---|---|---|---|---|---|---|
| Other components | BiCAT Z | 0.3 | — | 0.3 | 0.3 | 0.3 | 0.3 |
|  | A-400 | — | — | — | 54 | — | — |
|  | EBECRYL 600 | — | — | — | — | 54 | — |
| Total | | 100 | 100 | 100 | 100 | 100 | 100 |
| Ratio of NCO/active hydrogen | | 2.8 | 0 | 2.1 | 2.1 | 2.1 | 1.7 |
| Ratio of NCO/active hydrogen (N/15 mm) | Normal | 14.4 | 8.7 | 15.0 | Impossible to measure | Impossible to measure | Impossible to measure |
|  | In atmosphere of 85° C. | 5.8 | 2.1 | 4.5 | Impossible to measure | Impossible to measure | Impossible to measure |
|  | After immersion in solvent of electrolytic solution | 1.4 | <1.0 | 3.3 | | | |
| After immersion in solvent of electrolytic solution Coating strength (MPa) | | Impossible to measure | 13.4 | 2.9 | | | |

The raw materials in Tables 1 to 3 are as follows.
(B) Component
A-DCP: tricyclodecane dimethanol diacrylate, manufactured by Shin-Nakamura Chemical Co., Ltd.
(C) Component
(c0) Component
VISCOAT #155: cyclohexyl acrylate, manufactured by Osaka Organic Chemical Industry Ltd.
IBXA: isobornyl acrylate, manufactured by Osaka Organic Chemical Industry Ltd.
(c1) Component
HEAA: N-hydroxyethylacrylamide, manufactured by KJ Chemicals Corporation (theoretical amount of hydroxy group: 8.70 mmol/g)
(c2) Component
P-1A: 2-acryloyloxyethyl acid phosphate, manufactured by Kyoeisha Chemical Co., Ltd.
(D) Component
TKA-100: isocyanurate product of hexamethylene diisocyanate, manufactured by Asahi Kasei Corporation (NCO content: 5.35 mmol/g)
(E) Component
SB-PI 718: 2,4,6-trimethylbenzoyl diphenyl phosphine oxide and other components, manufactured by SHUANG-BANG INDUSTRIAL Corporation
BiCAT Z: zinc neodecanoate, manufactured by Shepherd Chemical Company
A-400: polyethylene glycol #400 diacrylate, manufactured by Shin-Nakamura Chemical Co., Ltd.
EBECRYL 600: bisphenol A type epoxy acrylate, manufactured by Daicel-Allnex Ltd.

Each adhesive composition of Examples 1 to 9 exhibited excellent intensity in all of the normal T-shape peel strength, the T-shape peel strength in an atmosphere at 85° C., the T-shape peel strength after immersion in a solvent of an electrolytic solution, and the coating strength after immersion in a solvent of an electrolytic solution.

On the contrary, in the adhesive composition of Comparative Example 1, the T-shape peel strength after immersion in a solvent of an electrolytic solution was degraded compared to each adhesive composition of Examples 1 to 9. Further, the coating strength was not able to be measured using the adhesive composition of Comparative Example 1 because the cured product was brittle and the cured adhesive sheet was not able to be prepared.

In the adhesive composition of Comparative Example 2, the T-shape peel strength in an atmosphere at 85° C. and the T-shape peel strength after immersion in a solvent of an electrolytic solution were degraded compared to each adhesive composition of Examples 1 to 9.

In the adhesive composition of Comparative Example 3, the T-shape peel strength after immersion in a solvent of an electrolytic solution and the coating strength after immersion in a solvent of an electrolytic solution were degraded compared to each adhesive composition of Examples 1 to 9.

The adhesive composition of Comparative Example 4 was obtained by blending diacrylate of a polyethylene glycol skeleton in place of the (B) component, and the compatibility with the (A) component was degraded and separation occurred. Therefore, the packaging material for a battery casing and the cured adhesive sheet were not able to be prepared, and thus the peel strength and the coating strength were not able to be measured.

The adhesive composition of Comparative Example 5 was obtained by blending epoxy acrylate in place of the (B) component, and the compatibility with the (A) component was degraded and separation occurred. Further, since the composition had a high viscosity, the packaging material for a battery casing and the cured adhesive sheet were not able to be prepared. Therefore, the peel strength and the coating strength were not able to be measured.

The adhesive composition of Comparative Example 6 was obtained by blending an excessive amount of the (A) component. Since the composition had a high viscosity and degraded coatability. Therefore, the packaging material for a battery casing and the cured adhesive sheet were not able to be prepared, and thus the peel strength and the coating strength were not able to be measured.

INDUSTRIAL APPLICABILITY

The UV curable adhesive composition for laminating the metal foil and the resin film according to the present invention has excellent productivity and excellent adhesive strength after immersion in an electrolytic solution and at a high temperature and thus is suitably used for bonding particularly an aluminum foil and a thermally fusible resin film. Further, since the laminate according to the present invention has excellent heat resistance and electrolytic solution resistance, the laminate is suitably used for a packaging material for a battery casing used for preparing a secondary battery such as a lithium ion battery. Further, a battery case having excellent heat resistance and electrolytic solution resistance can be produced by molding this laminate. In addition, a long-life safe secondary battery can be produced by using this battery case.

The invention claimed is:

1. An adhesive for laminating a metal foil and a resin film, comprising:
   (A) 1% to 20% by mass of polyurethane which has at least one functional group selected from the group consisting of a hydroxy group, an acryloyl group, and a carboxy group;
   (B) 30% to 90% by mass of a monomer which does not has an active hydrogen group and has two or more ethylenically unsaturated bonds;
   (C) 1% to 55% by mass of an aliphatic monomer which has one ethylenically unsaturated bond;
   (D) 1% to 15% by mass of a polyisocyanate compound; and
   (E) 0.5% to 5% by mass of a photoinitiator,
   wherein the (B) has at least one cyclic structure selected from the group consisting of an alicyclic structure, an aromatic ring structure, and a heterocyclic structure, and
   the (C) has at least one group selected from the group consisting of an open chain hydrocarbon group having 1 to 12 carbon atoms and an alicyclic group having 5 to 10 carbon atoms.

2. The adhesive according to claim 1,
   wherein the (A) has at least one selected from the group consisting of polyurethane polyol (a1), polyurethane acrylate (a2), and carboxy group-containing polyurethane (a3).

3. The adhesive according to claim 2,
   wherein the polyurethane polyol (a1) is polyurethane polyol obtained by copolymerizing (1) polyol, (2) hydrocarbon having a saturated or unsaturated cyclic hydrocarbon structure and two or more hydroxy groups, and (3) polyisocyanate compound.

4. The adhesive according to claim 3,
   wherein the polyol is at least one selected from the group consisting of (1a) polyolefin polyol which does not have an alicyclic structure and (1b) polyester polyol which has a constitutional unit derived from a hydrogenated dimer acid and a constitutional unit derived from a hydrogenated dimer diol.

5. The adhesive according to claim 2,
   wherein the polyurethane acrylate (a2) is polyurethane acrylate obtained by copolymerizing (1) polyol, (2) hydrocarbon having a saturated or unsaturated cyclic hydrocarbon structure and two or more hydroxy groups, (3) polyisocyanate compound, and (4) (meth) acrylate having one or more hydroxy groups.

6. The adhesive according to claim 2,
   wherein the carboxy group-containing polyurethane (a3) is carboxy group-containing polyurethane obtained by copolymerizing (1) polyol, (2) hydrocarbon having a saturated or unsaturated cyclic hydrocarbon structure and two or more hydroxy groups, (3) polyisocyanate compound, and (5) compound having one or more hydroxy groups and one or more carboxy groups.

7. The adhesive according to claim 1,
   wherein the (C) contains an aliphatic monomer (c1) containing an active hydrogen group and having one ethylenically unsaturated bond.

8. The adhesive according to claim 1,
   wherein the (C) contains an aliphatic monomer (c2) containing phosphorus and having one ethylenically unsaturated bond.

9. The adhesive according to claim 7,
   wherein a ratio (NCO/active hydrogen) of the number of isocyanate groups contained in the (D) to the total number of active hydrogens contained in the (A) and the (c1) is 1.5 or greater.

10. A laminate,
    wherein a metal foil and a resin film are laminated by interposing an adhesive layer formed by curing the adhesive according to claim 1 therebetween.

11. The laminate according to claim 10,
    wherein the metal foil is an aluminum foil, and the resin film includes a thermally fusible resin film.

12. The laminate according to claim 10,
    wherein a thickness of the metal foil is in a range of 10 to 100 μm, and
    a thickness of the resin film is in a range of 9 to 100 μm.

13. A packaging material for a battery casing, comprising: the laminate according to claim 10.

14. A battery case comprising:
    the packaging material for a battery casing according to claim 13.

15. A method of producing a battery case, comprising:
    performing deep drawing molding or stretch molding on the packaging material for a battery casing according to claim 13.

* * * * *